(No Model.) 7 Sheets—Sheet 1.

F. LEMAN.
DIAL SPACING MACHINE.

No. 283,350. Patented Aug. 14, 1883.

Witnesses:
Jas. E. Hutchinson.
Henry C. Hazard.

Inventor.
Frank Leman, by
Prindle & Russell, his Atty's (No Model.)  7 Sheets—Sheet 2.

F. LEMAN.
DIAL SPACING MACHINE.

No. 283,350.  Patented Aug. 14, 1883.

Witnesses:
Jas. E. Hutchinson.
Henry C. Hazard

Inventor.
Frank Leman by
Prindle and Russell, his Attys (No Model.)   F. LEMAN.   7 Sheets—Sheet 3.

DIAL SPACING MACHINE.

No. 283,350.   Patented Aug. 14, 1883.

Witnesses:
Jas. E. Hutchinson.
Henry C. Hazard.

Inventor:
Frank Leman, by
Dindle & Russell, his Atty's (No Model.) 7 Sheets—Sheet 4.

F. LEMAN.
DIAL SPACING MACHINE.

No. 283,350. Patented Aug. 14, 1883.

Witnesses:
Jas. E. Hutchinson.
Henry C. Hazard.

Inventor
Frank Leman, by
Prindle and Russell, his Attys (No Model.) 7 Sheets—Sheet 5.

F. LEMAN.
DIAL SPACING MACHINE.

No. 283,350. Patented Aug. 14, 1883.

Witnesses:
Jas. E. Hutchinson.
Henry C. Hazard.

Inventor:
Frank Leman by
Crosby and Russell, his Attys (No Model.)  7 Sheets—Sheet 6.

F. LEMAN.
DIAL SPACING MACHINE.

No. 283,350.  Patented Aug. 14, 1883.

Witnesses:
Jas. E. Hutchinson.
Henry C. Hazard.

Inventor.
Frank Leman by
Chindle & Russell, his Attys.

(No Model.) 7 Sheets—Sheet 7.
F. LEMAN.
DIAL SPACING MACHINE.
No. 283,350. Patented Aug. 14, 1883.
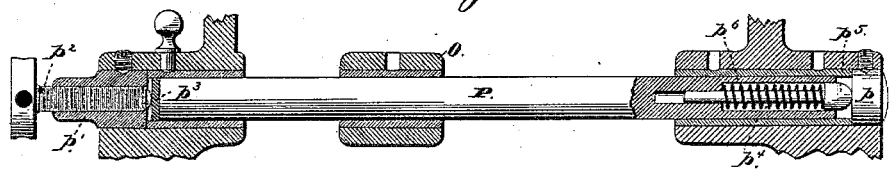
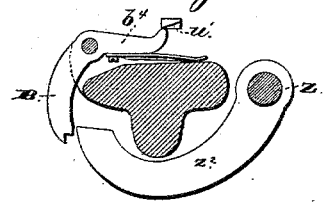
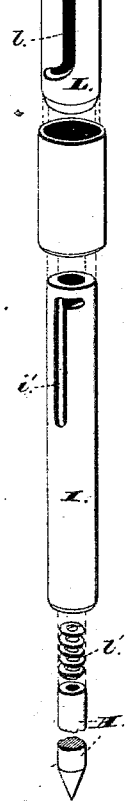
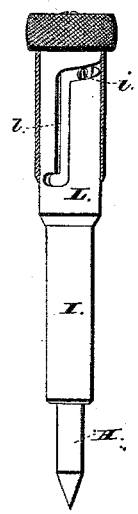
Witnesses:
Jas. E. Hutchinson.
Henry C. Hazard.
Inventor.
Frank Leman, by
Prindle & Russell, his Atty's

UNITED STATES PATENT OFFICE.

FRANK LEMAN, OF ELGIN, ILLINOIS.

DIAL-SPACING MACHINE.

SPECIFICATION forming part of Letters Patent No. 283,350, dated August 14, 1883.

Application filed May 7, 1883. (No model.)

*To all whom it may concern:*

Be it known that I, FRANK LEMAN, of Elgin, in the county of Kane, and in the State of Illinois, have invented certain new and useful Improvements in Dial-Spacing Machines; and I do hereby declare that the following is a full, clear, and exact description thereof, reference being had to the accompanying drawings, making a part of this specification, in which—

Figure 1:
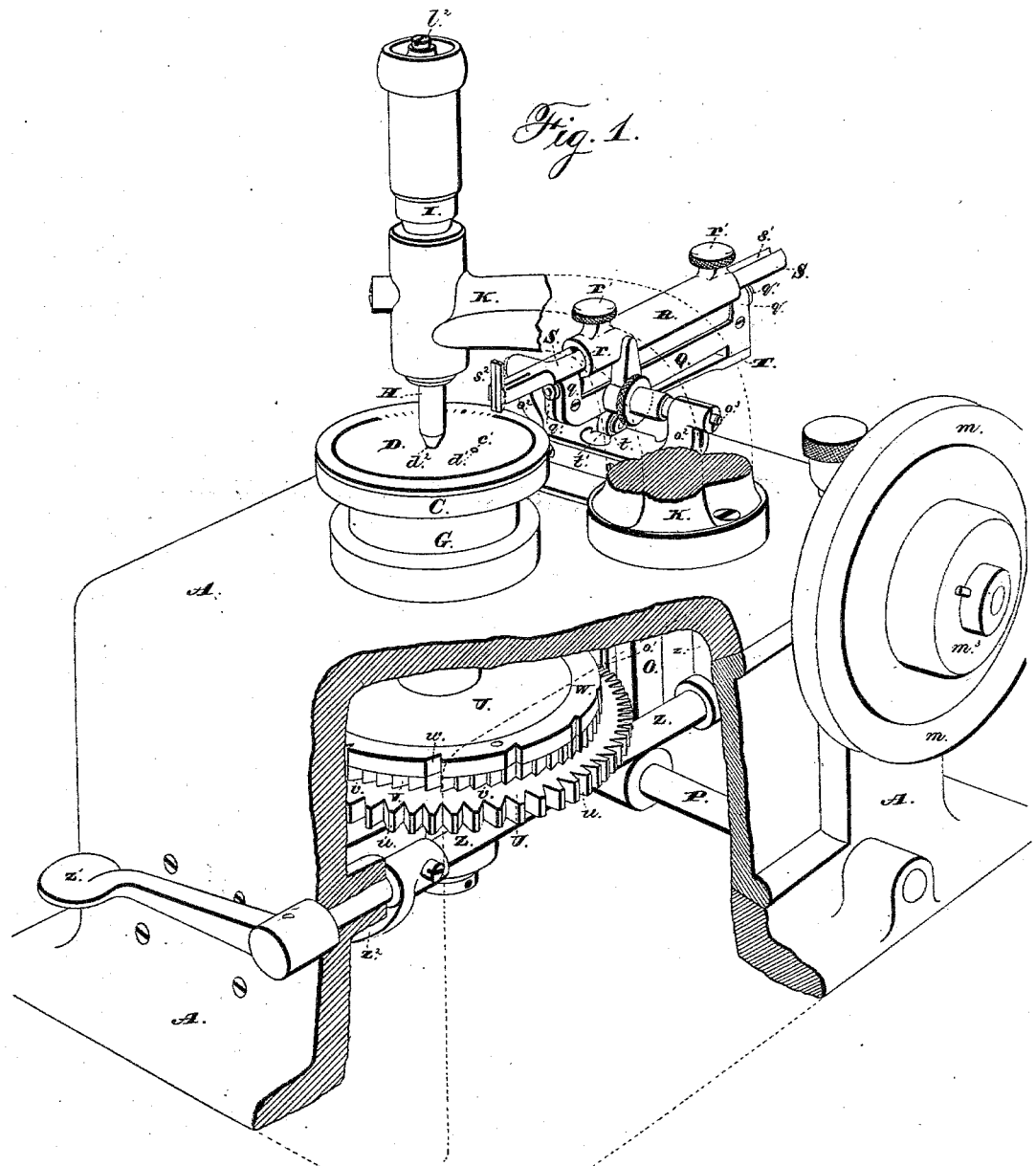
Figure 2:
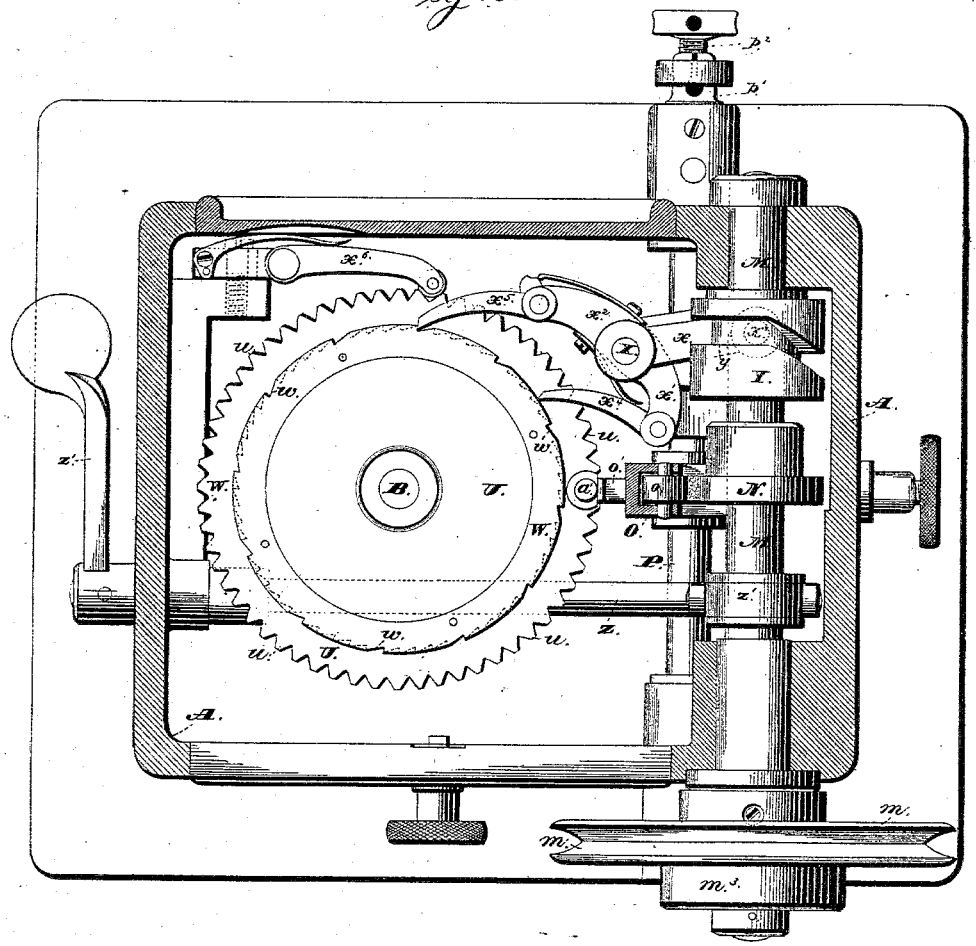
Figure 3:
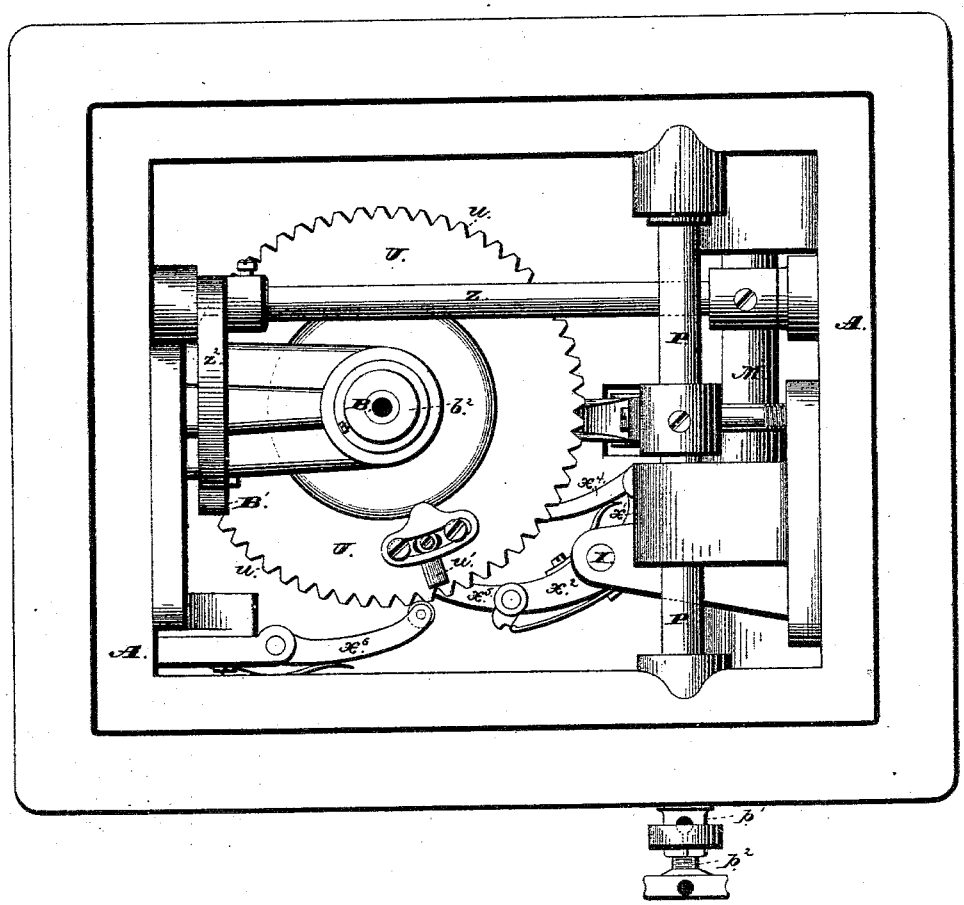
Figure 4:
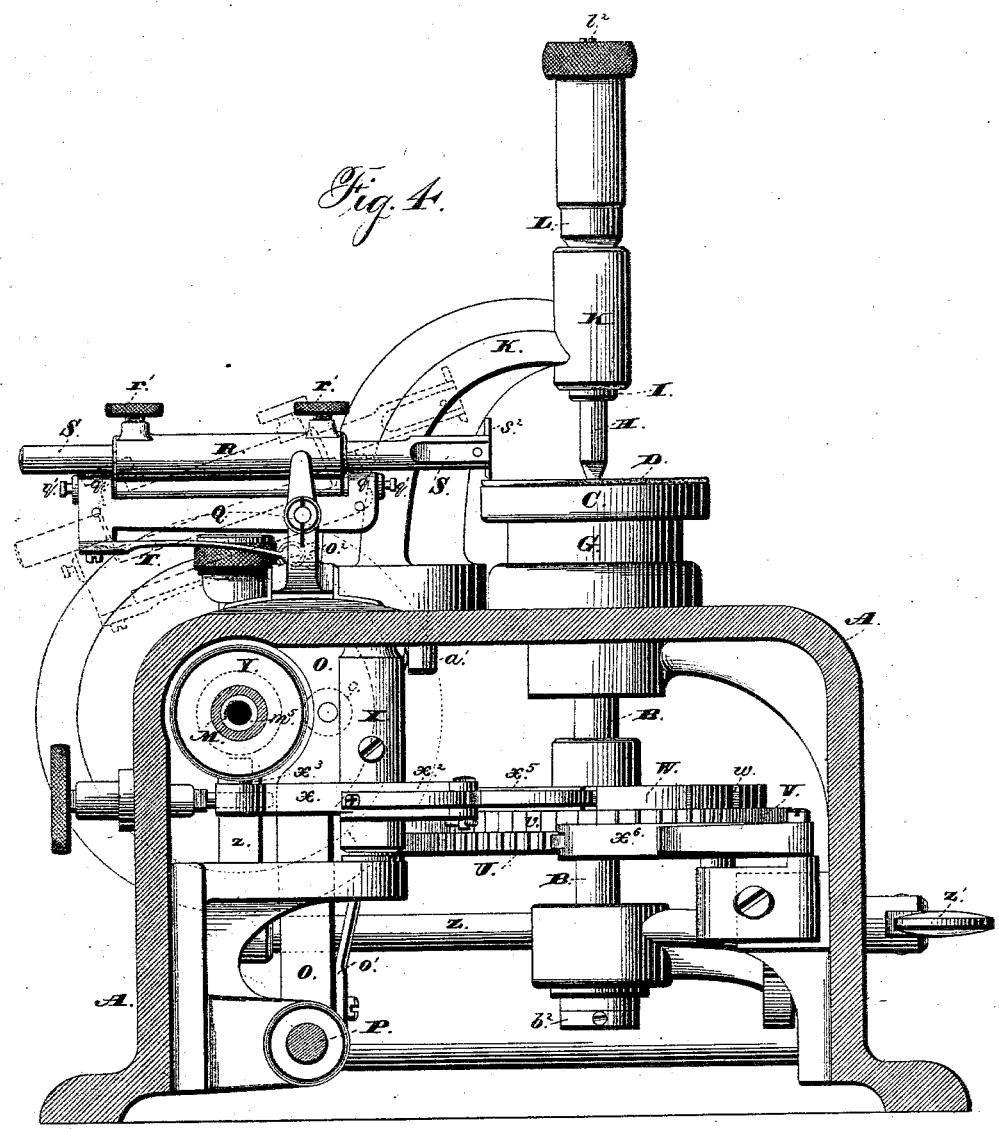
Figure 5:
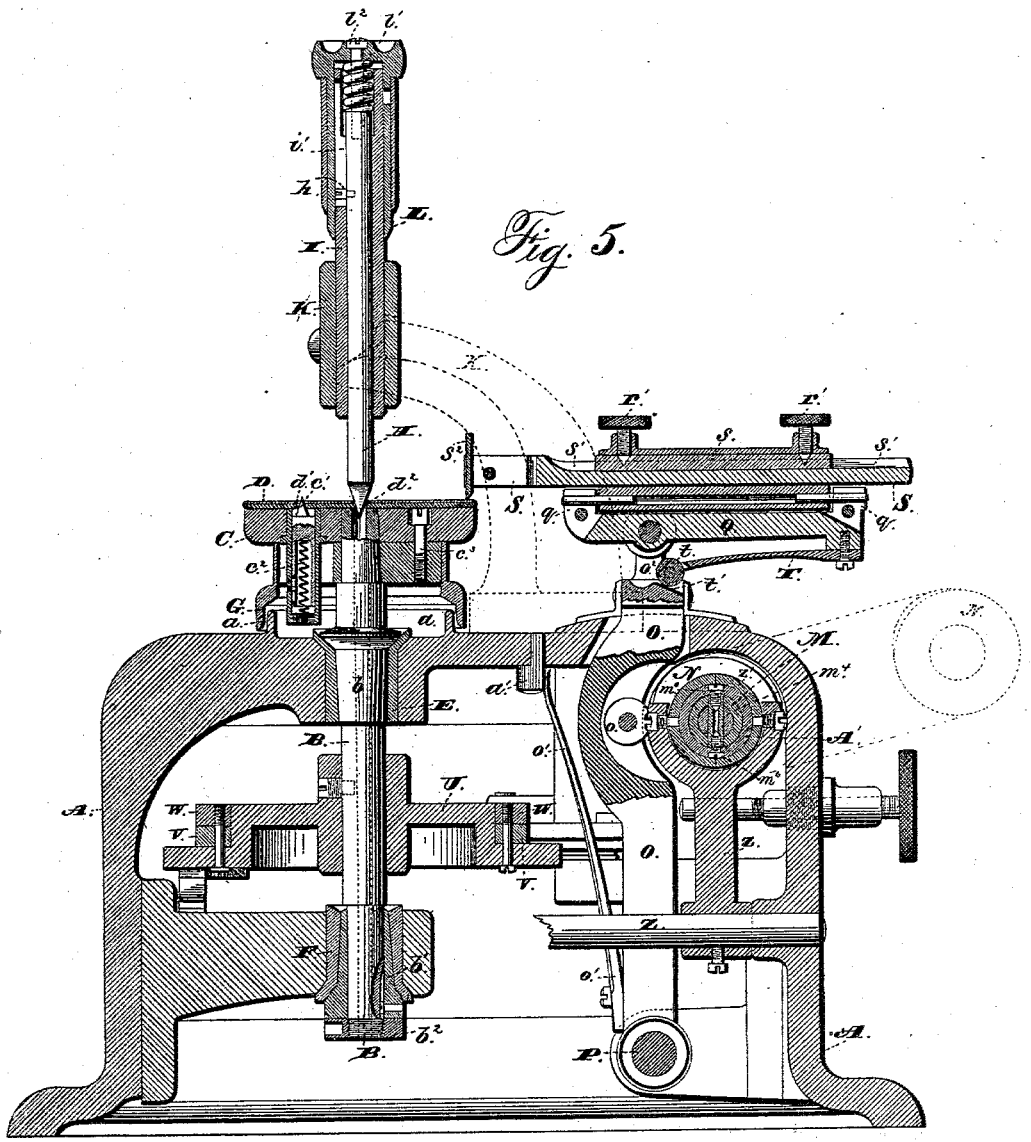
Figure 6:
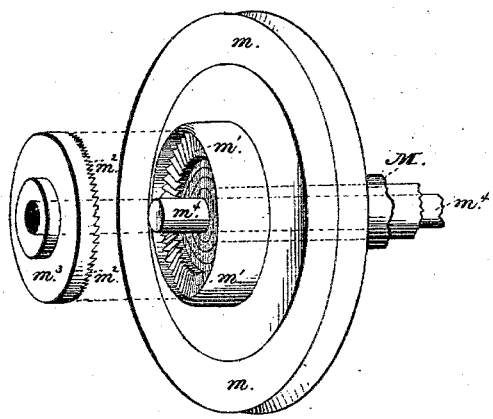
Figure 7:
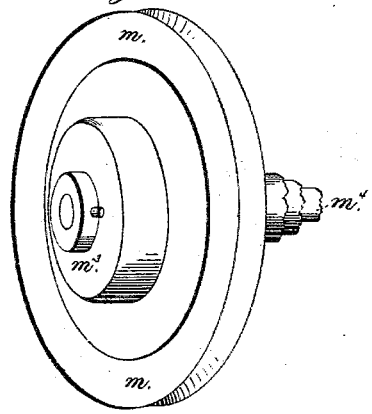
Figure 8:
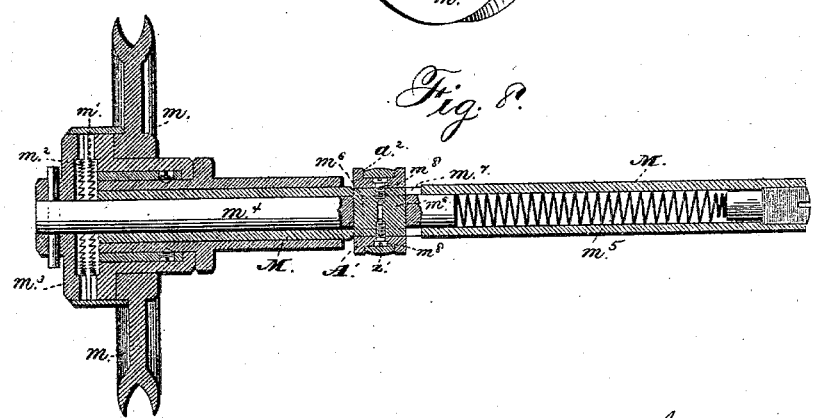

Figure 1 is a perspective view of my machine as arranged for use, a portion of the casing being removed to show the operative parts. Fig. 2 is a plan view of the upper side of the same, the top of said casing being removed. Fig. 3 is a like view of the lower side of said machine. Fig. 4 is a side elevation of the same, with the intervening-wall of the casing removed. Fig. 5 is a vertical central section upon a line passing from front to rear. Fig. 6 is a perspective view of the operating-shaft and its clutch separated from each other. Fig. 7 is a like view of the same combined. Fig. 8 is a central longitudinal section of said shaft. Fig. 9 is a central longitudinal section of the shaft which forms a pivotal bearing for the vibrating arm. Fig. 10 is a rear elevation of the means employed for locking in and releasing from engagement the clutch which connects the driving-pulley with the driving-shaft. Fig. 11 is a perspective view of the parts of the dial-holding spindle separated from each other; and Fig. 12 is an elevation, partly in longitudinal section, of the same combined.

Letters of like name and kind refer to like parts in each of the figures.

The design of my invention is to enable the dials of time-pieces to be easily, rapidly, and accurately spaced; and to this end it consists, principally, in a dial-spacing machine in which are combined the following elements, to wit: means for holding a dial in position and for intermittingly rotating the same upon its axial center; means for removing from the surface of said dial all unburned enamel not required for the minute-marks, and means whereby the movements of said dial are automatically regulated to cause each fifth minute-mark to have a greater width than the intervening marks, substantially as and for the purpose hereinafter specified.

It consists, further, in combining with the dial-spacing mechanism named means whereby the movements of the operative parts are automatically arrested when the dial has made one complete revolution, substantially as and for the purpose hereinafter shown.

It consists, further, in the means employed for intermittingly rotating the dial, substantially as and for the purpose hereinafter shown and described.

It consists, further, in the means employed for forming the minutes-marks upon the dial, substantially as hereinafter specified.

It consists, further, in the means employed for setting in motion and automatically arresting the motion of the operative parts, substantially as and for the purpose hereinafter shown.

It consists, finally, in the means employed for pivoting the vibrating arm which gives motion to the spacer-tool, substantially as and for the purpose hereinafter set forth.

In the annexed drawings, A represents the frame or casing of my machine, which has, preferably, a rectangular shape, is open at its bottom, and at each side is provided with a removable plate, through which access may be had to its interior.

Journaled vertically within the frame A, near its front side, is a spindle, B, which upon its upper projecting end has secured a disk or table, C, that corresponds in size to the dial D to be operated upon, and is provided with openings for the reception of the pins $d$ of the same. A pointed pin, $c'$, projecting above the surface of said table and held at its upper limit by means of a spring, $c^2$, engages with the seconds-arbor opening $d'$ of said dial, and thus insures the relative position of the latter and said table.

In order that the spindle B may be prevented from vibration or longitudinal motion within its bearings, the upper journal, $b$, is made slightly tapering from its lower end nearly to its upper end, and from thence to said upper end has a sharp outward and upward inclination, while the bearing or bushing E, which receives said journal, corresponds thereto in size and shape. The lower end of the spindle B is straight and threaded for a short distance, and upon the same is fitted a sleeve, $b'$, that exteriorly corresponds to the size and shape of the journal $b$, and is held in place by means of a nut, $b^2$, which is fitted over said threaded part, and also enables said sleeve to be moved upward. Said sleeve-journal fits into a bearing, F, which, like the bearing E, is formed by a bushing that corresponds to the shape of its journal. By means of said nut said sleeve may be moved upward until sufficient play only is left to enable said spindle to turn freely.

In order that dust and dirt may be excluded from the upper bearing of the spindle B a housing, G, is secured to the same below the table C, and from thence extends downward to the upper face of the casing A, where its lower end incloses an annular flange, $a$, which is formed upon said casing. As a matter of convenience said housing is rigidly attached to said spindle, while said table fits over the upper end of the latter and is held in place by means of a screw, $c^3$, that passes through the same into said housing.

The dial D is held down upon the table C by means of a pointed spindle, H, that is placed within the central opening, $d^2$, which is provided for the hands-arbors. Said spindle extends upward through a hollow mandrel, I, that is secured within an arm, K, which projects from the upper face of the casing A upward and diagonally forward, so as to bring its end over the center of said table.

In order that the spindle H may be readily moved into or out of engagement with the dial D its upper end is pivoted to the end of a sleeve, L, which incloses the same and fits loosely over the upper portion of the mandrel I, the arrangement being such that said spindle may be moved lengthwise within the latter by means of and with said sleeve, while said sleeve may be rotated independently upon or around said mandrel. Within the inner face of said sleeve is provided a helical groove, $l$, which is mainly in a line with the axis of the same, but from each end of said straight part extends laterally, as shown. A stud, $i$, projecting radially outward from the mandrel into the grooves $l$, completes the construction, which operates as follows, viz: When the sleeve L is turned so as to bring the straight portion of the groove $l$ over the stud $i$, said sleeve and the spindle H may be moved longitudinally until said stud reaches the lateral curving end of said groove, when by turning said sleeve so as to cause the latter to pass over said stud said parts will be locked in position. In use said spindle is moved directly downward until its pointed end is nearly in engagement with the dial, after which a partial rotation of said sleeve carries said spindle the remaining distance and locks the same in place, while to raise said spindle and lock the same in an elevated position the reverse of the operation described is necessary. A yielding pressure of the spindle H upon the dial D is secured by placing between the upper end of said spindle and the upper end of the sleeve L a spiral spring, $l'$, that encircles the pivotal screw $l^2$ by which said parts are connected together. A stud, $h$, projecting radially from said spindle into a longitudinal slot, $i'$, which is provided in the mandrel I, prevents the former from rotating within the latter while permitting of its free longitudinal motion therein.

Journaled within the rear upper side of the frame or casing A is a hollow shaft, M, upon which, at or near the transverse center of said casing, is secured a cam, N, that is adapted to give a slight impulse at one point only of its revolution. Said cam impinges upon a lever, O, which is secured at its lower end to or upon a shaft, P, which rests in suitable bearings at or near the lower rear side of said casing, from whence said lever extends in front of said cam upward through the top of said casing. The side of the lever O adjacent to the cam N is preferably curved, as shown, and within the same is journaled a roller, $o$, that furnishes a bearing for said cam. A flat spring, $o'$, secured at one end to the lower portion at the front side of said lever, and having its upper end in engagement with a lug, $a$, that projects downward from the top of the casing A, holds said lever with a yielding pressure against said cam. The upper end of the lever O is provided with two outward and upward curving arms $o^2$, that are arranged in a line with the shaft M, and have each a threaded opening, through which passes a screw, $o^3$. Said screws have the same axial line, and upon their inner ends is journaled a bar, Q, which has a line at a right angle to said shaft M, and is capable of oscillation upon its said journals in a vertical plane having the same line.

At each end of the bar Q is an upward-extending lug, $q$, which receives a screw, $q'$, that has the same axial line as the opposite screw $q'$, and in connection with the latter furnishes a bearing for a head, R, that is capable of oscillation in a plane having a right angle to the line of said bar Q. The upper portion of said head R is provided with a round longitudinal opening, $r$, through which passes a bar, S, which extends beyond each end of said head, is capable of longitudinal adjustment therein, and when so adjusted may be secured in place by means of two set-screws, $r'$, that pass downward through said head and impinge upon the upper side of said bar, or upon a gib, $s$, that corresponds to and rests within a V-shaped groove, $s'$, that is formed therein. The front end of the bar S is adapted to receive a graver, $s^2$, that occupies a position having a right angle to the line of said bar, and is capable of such vertical adjustment as is required in order that its lower end may be in position for work. The graver-holding mechanism thus described has such height as to cause the bar S to be slightly above the dial D, in which position the graver $s^2$ may be caused to rest upon the face of said dial, and, by the operation of the shaft M, cam N, and lever O, to move over the same upon a radial line a distance equal to about twice the length of the minutes-marks to be formed thereon. A spring, T, secured at one end to the rear end of the bar Q, and from thence extending forward to or near the axis of the same, is provided at its front end with a roller, t, which bears upon a ⋀-shaped surface, t', and operates to raise the rear end of said bar Q and to hold said graver with a yielding pressure upon said dial. When not in use, said mechanism may be turned upward to the position shown by dotted lines of Fig. 4, in which event said spring-roller t passes over said bearing-surface t', and, resting upon the front inclined face of the same, holds said parts in such elevated position.

In order that the shaft P may be adjusted to position and caused to operate freely without end motion, which would render inaccurate the movements of the graver $s^2$, at one end of said shaft is a fixed solid end bearing, $p$, and at its opposite end a fixed hollow bearing, $p'$, through which passes a screw-plug, $p^2$, having a semi-spherical end that bears directly against the end of said shaft, or against an interposed washer, $p^3$. Within the opposite end of said shaft is an axial recess, $p^4$, that contains a plug, $p^5$, which has a rounded outer end, and is pressed outward by means of a spiral spring, $p^6$, so as to cause said rounded end to impinge upon said solid bearing $p$. As thus arranged said shaft may be adjusted longitudinally within certain limits by means of said screw-plug $p^2$, while by means of said spring-plug $p^5$ and the form of the end bearing-surfaces all end shake is prevented without causing unnecessary friction.

The automatic rotation of the dial is secured by the following described means, viz: Secured to or upon the spindle B, midway between its journals, is a wheel, U, which upon its periphery is provided with sixty teeth, $u$. Above said wheel and secured to the same is a second smaller wheel, V, which is also provided with sixty peripheral teeth, $v$, while above said wheel V is a third wheel, W, that has the same diameter, and is provided with twelve teeth, $w$, that are equidistant and each exactly coincides with a tooth $v$ of said wheel V.

Journaled vertically within the casing A, in front of the shaft M and at one side of the lateral center of the machine, is a rock-shaft, X, which is provided with three horizontal arms, $x$, $x'$, and $x^2$, that extend outward from nearly equidistant points. Said arm $x$ passes beneath said shaft M, and is provided at its rear end and upper side with a stud, $x^3$, that engages with a groove, $y$, which is formed within the periphery of a cam, Y, that is secured to and revolves with said shaft. Said groove has such longitudinal form as to cause said rock-shaft to remain at rest while the graver $s^2$ is moving over the dial D, and to have a quick oscillation upon its journals while said graver is at rest. The arm $x'$ extends from the rock-shaft X rearward and toward the opposite side of the machine, and carries upon its end a spring-pawl, $x^4$, which engages with the teeth $v$ of the wheel V. Said arm has such length that each double oscillation of said rock-shaft will cause its said pawl to rotate said wheel one tooth. The arm $x^2$ extends forward and outward from the rock-shaft X, and upon its outer end carries a spring-pawl, $x^5$, which bears upon the periphery of the wheel W, and engages with the teeth $w$ whenever the latter are brought into position. The length of said arm is such as to cause its said pawl to move the dial D the same distance that it is moved by the pawl $x^4$; but as the latter operates upon the forward motion of said rock-shaft and said pawl $x^5$ upon the return motion of said shaft, the result is that said dial is moved one-sixtieth of a revolution by said pawl $x^4$ at each revolution of the shaft M, and at each fourth revolution of the latter said pawl $x^5$ engages and moves said dial an additional one-sixtieth revolution, making the entire distance moved by said dial each fourth time one-thirtieth of a revolution. A spring-pawl, $x^6$, adapted to engage with the teeth $u$ of the wheel U, holds said dial-table in position, and prevents other movement than such as is caused by said pawls $x^4$ and $x^5$.

The graver $s^2$ has a straight lower end that has a width equal to the space occupied by two minutes upon the dial D, less the width of each fifth mark, which is made heavier than the intervening marks, while at the transverse center of the lower end of said graver is formed a notch that corresponds in width to the width of the ordinary smallest of said minute-marks. If, now, the dial D is provided with a circle of dried black enamel from which to cut out the minute-marks and placed in position, and the graver $s^2$ caused to operate upon the same, it will be found that said graver will scrape away said enamel and leave a fine line where its center notch comes during each of its movements, and that each time that said dial is moved one-thirtieth of a revolution there will be formed a minute mark which has double width. Said heavy minute-mark consists of the enamel that is left in front of said graver while the fourth minute-mark is being produced, and in rear of said graver while producing the sixth minute-mark, and may be increased or diminished in width by diminishing or increasing the width of said graver. By this arrangement it will be seen that if the dial is properly adjusted with reference to the table-feeding mechanism the minute-marks will be properly ruled out, and each fifth mark will not only have the desired additional width, but will be located at the hours divisions of said dial.

The machine is operated through a pulley, $m$, which is journaled upon the projecting end of the shaft M, and is connected therewith, when required, by the following means, viz: Within the outer face of the hub of said pulley is an annular face of inclined teeth $m'$, that are engaged by correspondingly oppositely-inclined teeth, $m^2$, that are formed within the inner face of a disk-shaped clutch-plate, $m^3$.

The clutch-plate $m^3$ is secured upon the end of a rod, $m^4$, which fits loosely within the axial opening of the shaft M, and is capable of longitudinal motion therein, so as to cause said clutch-plate to engage with or be released from engagement with the toothed face $m'$. A spiral spring, $m^5$, placed between the inner end of the rod $m^4$ and the closed opposite end of the shaft M, operates to hold the clutch-plate $m^3$ with a yielding pressure out of engagement with the toothed face $m^2$ of the pulley $m$, while the engagement of said parts is effected, when desired, by means of a shaft, Z, which extends from the front of the frame A rearward beneath said shaft M, and is provided near its rear end with a radial arm, $z$, that extends upward and engages with a sectional ring, $z'$, which fits loosely within the peripheral groove $a^2$ of a collar, A', which is fitted loosely upon and revolves with said shaft. The shaft M and rod $m^4$ are connected together circumferentially, by means of a feather or key, $m^6$, which passes radially through said rod, and has its ends contained within longitudinal slots $m^7$ that are formed in said shaft, such arrangement permitting said rod to move longitudinally within said shaft the distance necessary for the engagement or separation of the clutch-plate $m^3$ and toothed face $m'$. The collar A' surrounds the shaft M and key $m^6$, and is connected with the latter by means of two screws, $m^8$, which pass radially through said collar into the ends of said key, the arrangement being such as to connect together the rod $m^4$ and said collar, and to enable the former to be readily moved by means of the latter longitudinally within and independent of said shaft. A laterally-projecting lever, $z'$, secured to the front projecting end of the shaft Z, enables the latter to be turned within its bearings, and through the arm $z$, collar A', and rod $m^4$, the clutch-plate $m^3$ to be engaged with the wheel $m$, whereby the motion of the latter is communicated to said shaft M and the operative machinery. The clutch is locked in place when the machine is started, and automatically released when the dial has been given an entire revolution, by the following means, to wit: Secured to the shaft Z, near the front wall of the casing A, is an arm, $z^2$, which extends laterally downward across and then upward in a curve, and has its outer end engaged by a spring-pawl, B', when said shaft is turned sufficiently to throw the driving-clutch into engagement, said pawl operating to securely lock said parts in such position.

To release the arm $z^2$ when the proper time arrives, the pawl B' is provided with a tailpiece, $b^4$, which extends laterally beneath the wheel U, and when said pawl is in engagement with said arm is in position for contact with an inclined lug, $u'$, that projects from the lower face of said wheel. Said lug is so placed upon said wheel that at the instant when the dial has made an entire revolution it comes into contact with and moves said pawl, and, by releasing said arm $z^2$, enables the spring $m^5$ to throw the clutch out of engagement.

The mechanism described enables dials to be minute-spaced in a more perfect manner and with greater rapidity by use of unskilled and low-priced assistance than has heretofore been practicable where the most skillful workmen were employed.

I do not claim, broadly, the graver, having a notch within its end, such construction having before been used.

Having thus fully set forth the nature and merits of my invention, what I claim as new is—

1. A dial-spacing machine in which are combined the following elements, to wit: means for holding a dial in position and for intermittingly rotating the same upon its axial center, means for removing from the surface of said dial all unburned enamel not required for the minute-marks, and means whereby the movements of said dial are automatically regulated to cause each fifth minute-mark to have a greater width than the intervening marks, substantially as and for the purpose specified.

2. In combination with the dial-spacing mechanism named, means whereby the movements of the operative parts are automatically arrested when the dial has made one complete revolution, substantially as and for the purpose shown and described.

3. As a means for holding the dial D upon the table C, the pointed spindle H, fitted within the mandrel I; the sleeve L, fitted over said mandrel and pivoted at its upper end to or with the upper end of said spindle, and provided interiorly with the groove $l$, and the stud $i$, projecting from said mandrel into said groove, all combined substantially as shown and described.

4. As a means for intermittingly rotating the dial-table C, the wheels U and V, secured upon the spindle B and provided each with sixty peripheral teeth, the rock-shaft X, having the radial arm $x$ and stud $x^3$, that engages with the cam-groove $y$ of the cam Y, and the radial arm $x'$ and spring-pawl $x^4$, which is adapted to engage with the teeth $v$ of said wheel V, in combination with means whereby said cam may be rotated, and with the pawl $x^6$, which engages with the teeth $u$ of said wheel U, substantially as specified.

5. In combination with means, substantially as described, whereby the dial is four times intermittingly moved one-sixtieth of a revolution, and then is once moved one-thirtieth of a revolution, a graver having a width less than twice the proposed space between two adjacent minute-marks upon said dial and a central notch corresponding to the width of the smallest minute-mark, together with means, substantially as described, whereby said graver is caused to move over the portion of said dial that is to be minute-marked after each partial revolution of the same, substantially as and for the purpose shown and described.

6. The combination of the hollow shaft M, provided with the slots $m^7$, the loose pulley $m$, having the toothed face $m'$, the clutch-plate $m^3$, provided with the toothed face $m^2$, the rod $m^4$, contained within said shaft and connected with said clutch-plate, the spiral spring $m^5$, the shaft Z, having the radial arm $z$ and lever $z'$, and the collar A', provided with the peripheral groove $a^2$, and connected with said rod $m^4$, through said slots $m^7$, by means of the screws $m^6$, substantially as and for the purpose set forth.

7. In combination with the shaft Z and with the clutch-operating mechanism shown projecting from said shaft, the arm $z^2$, the spring-pawl B', provided with the tail-piece $b^4$, and the inclined lug $u'$, projecting downward from the wheel U and engaging with said tail-piece, substantially as and for the purpose described.

8. In combination with the lever O, the shaft P, having the axial recess $p^4$, the plug $p^5$, rounded at its outer end, the spiral spring $p^6$, adapted to press said plug outward, the solid bearing $p$, the interiorly-threaded bearing $p'$, and the screw-plug $p^2$, having the rounded inner end, substantially as and for the purpose specified.

In testimony that I claim the foregoing I have hereunto set my hand this 23d day of April, 1883.

FRANK LEMAN.

Witnesses:
GEO. HUNTER,
W. H. CLOUDMAN.